United States Patent

Smith

[15] 3,701,210
[45] Oct. 31, 1972

[54] TEMPORARY VEHICLE MARKINGS

[72] Inventor: George E. Smith, Box 354, River Avenue, Island Heights, N.J. 08732

[22] Filed: June 9, 1970

[21] Appl. No.: 44,703

Related U.S. Application Data

[63] Continuation-in-part of Ser. No. 855,478, Sept. 5, 1969, abandoned.

[52] U.S. Cl. ............................................. 40/129 C
[51] Int. Cl. ............................................. G09f 7/00
[58] Field of Search....40/10, 10 A, 10 B, 129, 129 C

[56] References Cited

UNITED STATES PATENTS

| 1,534,223 | 4/1925 | LaPort | 40/129 C |
| 2,078,183 | 4/1937 | Ray | 40/129 C |
| 2,620,579 | 12/1952 | Dienes | 40/129 C |
| 3,461,584 | 8/1969 | Wilson | 40/129 C |

Primary Examiner—Jerome Schnall
Assistant Examiner—Wenceslao J. Contreras
Attorney—Robert G. McMorrow

[57] ABSTRACT

Identification means for vehicles, the identification means comprising indicia bearing panels with rigidifying slats adapted for temporary mounting on vehicle roofs, trunk deck lids, hoods, or the like, by adjustable straps.

3 Claims, 10 Drawing Figures

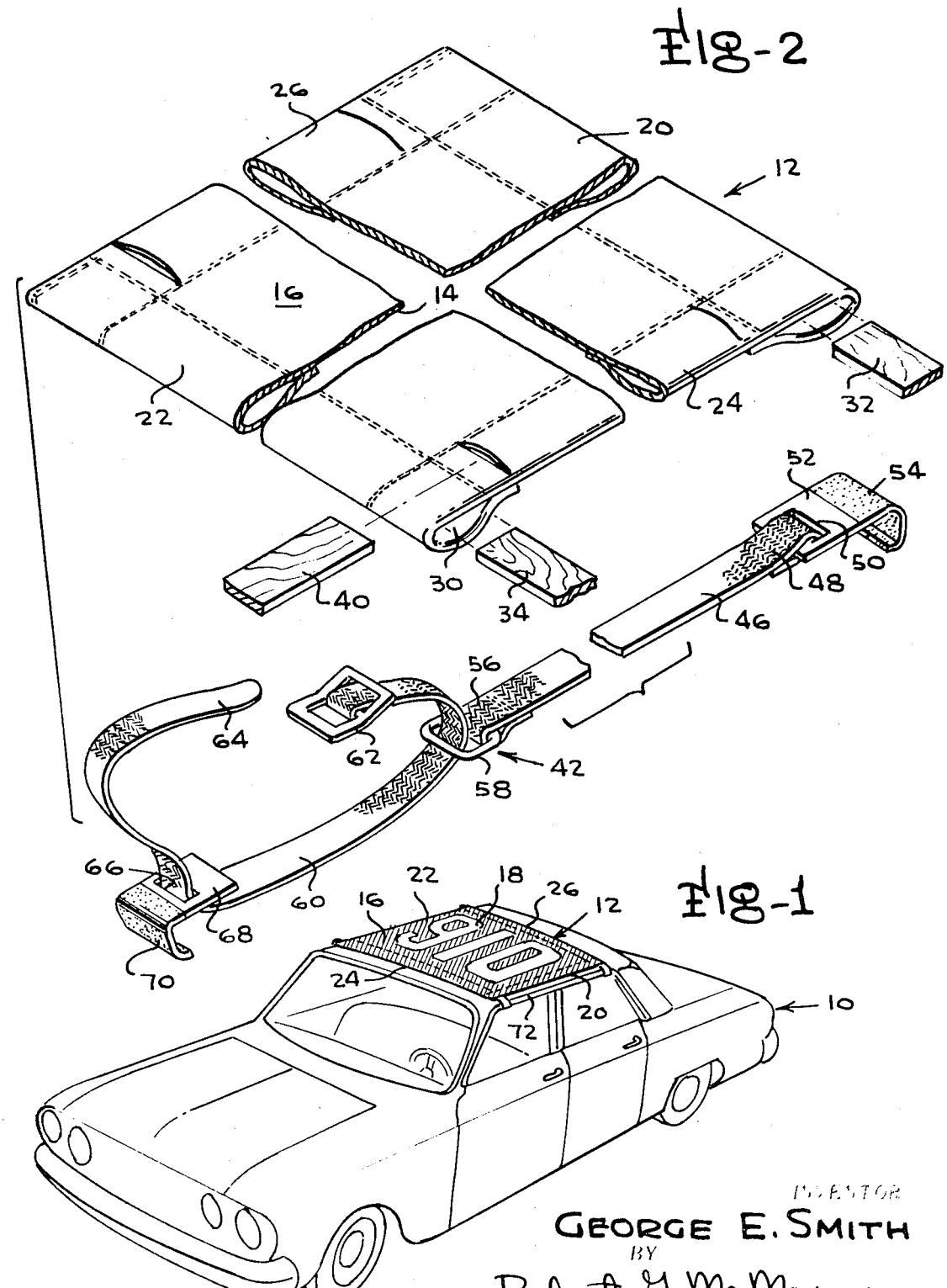

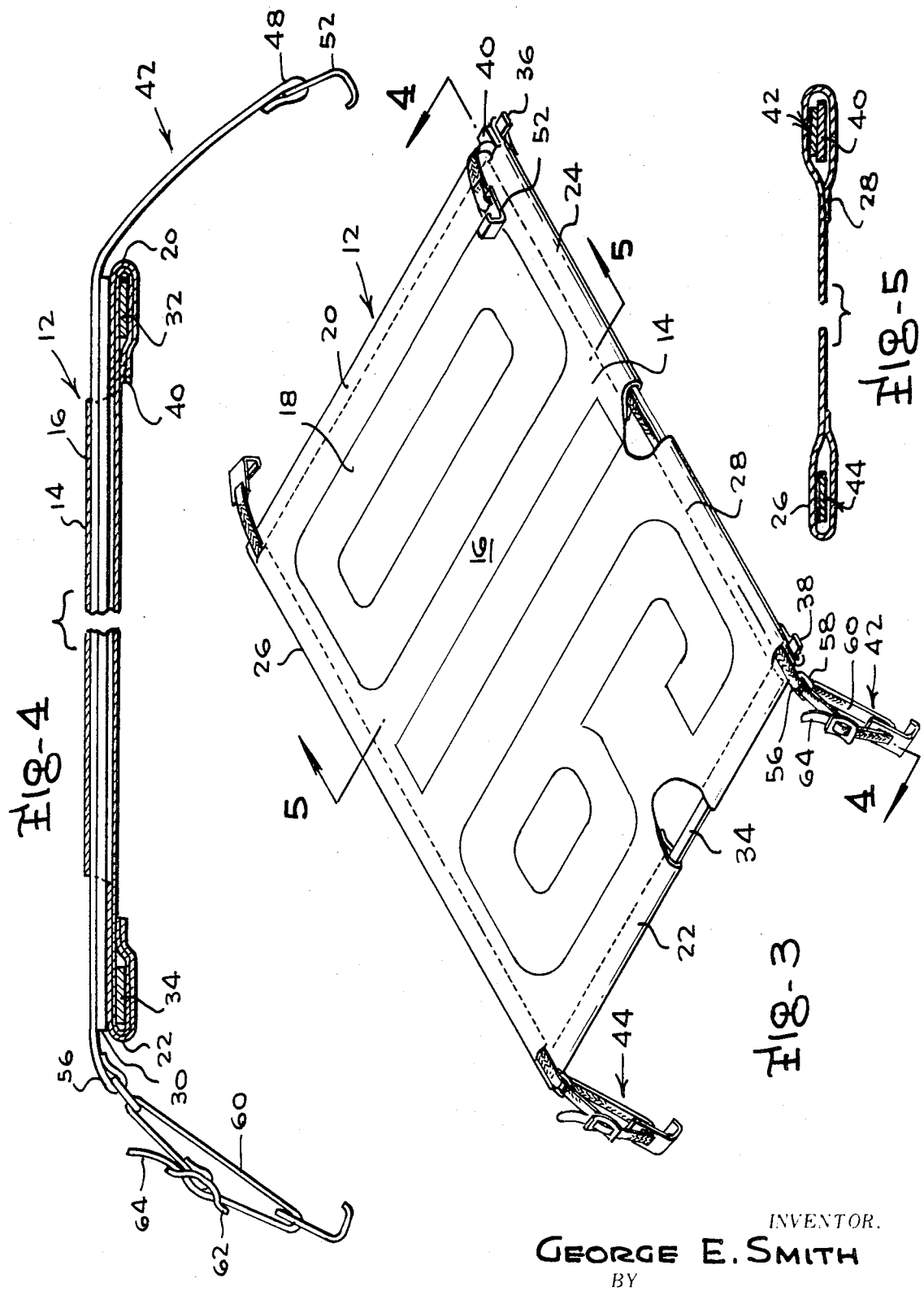

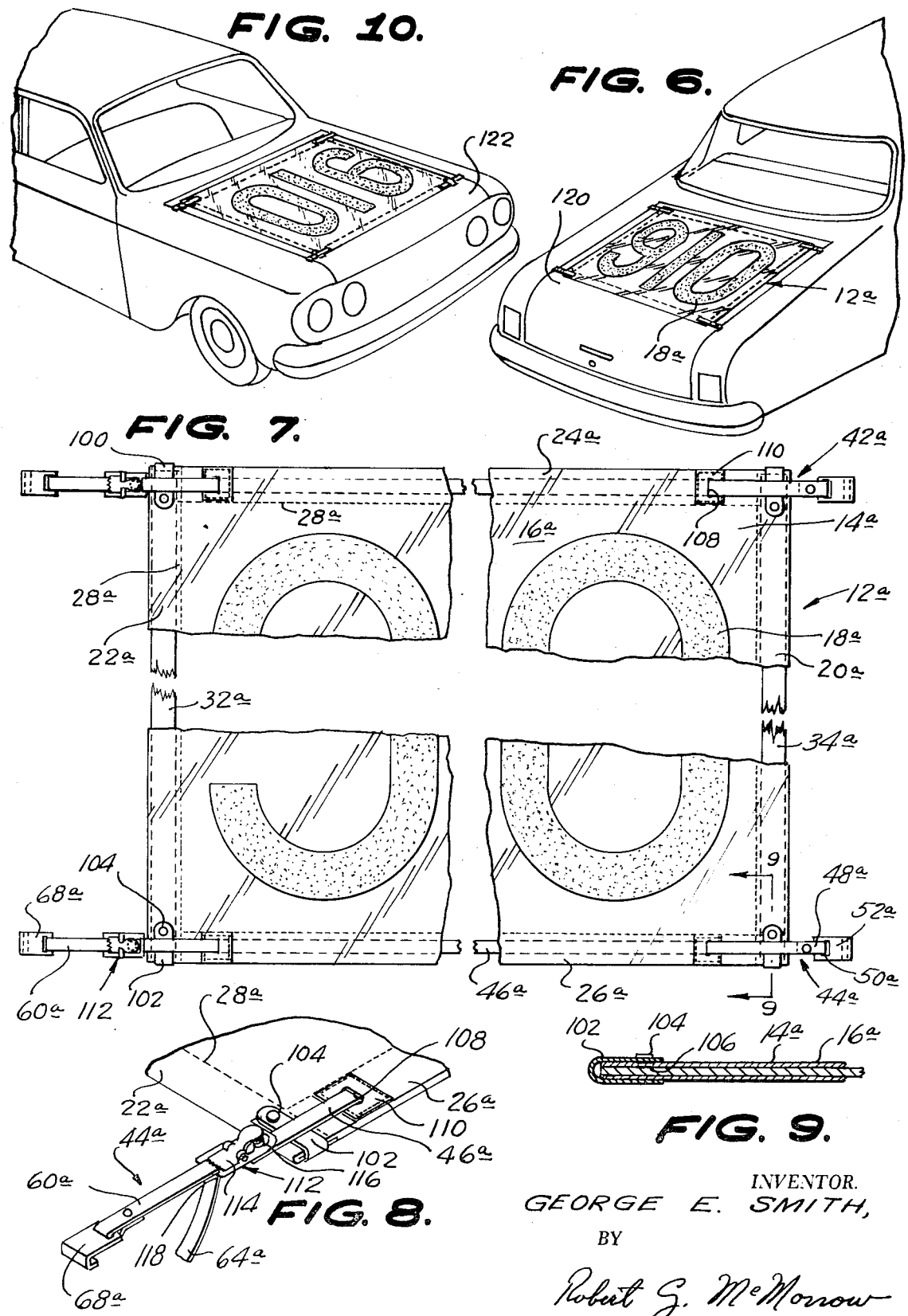

TEMPORARY VEHICLE MARKINGS

CROSS REFERENCE TO RELATED APPLICATION

This application is a continuation-in-part of my prior application Ser. No. 855,478, filed Sept. 5, 1969, and now abandoned.

BACKGROUND OF THE INVENTION

1. Field of the Invention

This invention relates to identification of motor vehicles, particularly from overhead as in coordinated air-ground operations in law enforcement activities or the like.

2. Statement of the Prior Art

Various signs and like indicia have heretofore been temporarily mounted on vehicle roofs. Examples of such prior proposals are found in the following U. S. Pats:

| Patent No. | Patentee | Issue Date |
| --- | --- | --- |
| 1,942,444 | O'Connor | Jan. 9, 1934 |
| 2,836,914 | Nelson | June 3, 1958 |
| 3,208,173 | Shank | Sept. 28, 1965 |
| 3,225,475 | Shank | Dec. 28, 1965 |

Such devices, while useful in advertising displays and the like, do not provide for effective overhead identification. Moreover, these devices do not, due to air resistance, permit high speed operation of a vehicle when in place.

SUMMARY OF THE INVENTION

The present invention provides readily attached and detached temporary markings for vehicle roofs. A principal environment of intended usage concerns the temporary marking of otherwise unmarked vehicles used in law enforcement, whereby police units may be identified from the air when a vehicle is in use in coordinated air-ground search activities. In such circumstances of use, it is necessary, for obvious reasons, that the device be adapted for very rapid mounting and dismounting, and that is be storable in minimum space when not in use.

An important objective of this invention concerns the provision of vehicle marking means which are stable and reliable, and which are not likely to be displaced even in high speed operation of vehicles. To this end, the invention provides identification markings having main fabric panels, and having rigidifying edge slats at the sides and, in one embodiment, at a leading edge thereof, and associated strap means which hold the slats in place in a new and novel arrangement.

Yet another object is to provide strap tightening means whereby the markings are rapidly and effectively mounted on the vehicle and tightened into operating positions.

Other and further objects and advantages of the invention will become apparent to those skilled in the art upon a consideration of the following specification when read in conjunction with the annexed drawings.

BRIEF DESCRIPTION OF THE DRAWINGS

FIG. 1 is a perspective view showing a vehicle with a first form of temporary identification means according to this invention in place thereon;

FIG. 2 is an enlarged perspective view of portions of the components of the invention, foreshortened for clarity of illustration;

FIG. 3 is a further prespective view of the components in assembled condition;

FIG. 4 is an enlarged, transverse cross-sectional view taken substantially on line 4—4 of FIG. 3, looking in the direction of the arrows;

FIG. 5 is an enlarged, foreshortened sectional view on line 5—5 of FIG. 3, looking in the direction of the arrows;

FIG. 6 is a perspective view illustrating a second form of the invention;

FIG. 7 is an enlarged, foreshortened plan view of a form of the invention shown in FIG. 6;

FIG. 8 is an enlarged perspective view showing the strap tightening means of the second form of the invention;

FIG. 9 is an enlarged sectional view taken substantially on line 9—9 of FIG. 7, looking in the direction of the arrows; and FIG. 10 shows an optional mounting position of the apparatus of FIGS. 6 through 9.

DESCRIPTION OF THE PREFERRED EMBODIMENTS:

Referring to FIGS. 1 through 5 of the drawings in more detail, a first form of identification means for temporary marking of an otherwise unmarked vehicle is therein identified by reference numeral 12. The assembly 12 includes a main panel element 14 formed of a suitable fabric. Preferably, the fabric is of a relatively durable type such as canvas, nylon, or the like, and it may be coated with a substance such as vinyl on one or more of its surfaces. The outer surface 16 of the main panel 14 has numerals 18 or other indicia thereon, and the numerals and surrounding surface are of contrasting colors whereby the numerals are clearly visible from extended distances. It will be understood that letters or other types of identification may be substituted for the numerals where required.

The panel 14 has side portions 20, 22, and leading and trailing end portions 24, 26, respectively. Each of the side and end portions is reverted, and the reverted portions are stitched or otherwise secured to the main panel, as at 28. Thus, each of the side and end portions has a flattened, tubular sleeve formed by such reversion and stitching. The sleeves each define a passageway, and the passageways are open at their ends, as indicated at 30 in the drawings.

Longitudinal slat means comprising elongated, substantially rigid slat members 32, 34 are disposed in the sleeves of the side portions 22, 24, respectively, and it will be observed in FIG. 3 that these slats have forward ends 36, 38 which project forwardly of the sleeves. The slats are rather tightly engaged in the sleeves, and are maintained in place therein frictionally, being removable for replacement if necessary by the application of force to the end portions thereof. A forward slat 40 is similarly disposed in the sleeve of the leading end portion 24 when the device is roof mounted. The slat 40 is of a length such that its ends overlie the forward ends 36 and 38 of the side slats. The sleeve of the rear end portion is preferably without a slat, although in some circumstances, it may be desirable to so incorporated a slat therein.

The slats may be formed of wood, light metal, or any similar material.

Each of the slats serves a rigidifying function, and the overlapping of the ends of the side slats by the forward slat further serves as a means to prevent wind deflection and/or flapping of the panel when the vehicle is in motion.

As a further means of accomplishing the foregoing objectives, and as a connection means for mounting of the device in place on a vehicle, strap means 42 and 44 are operatively associated with the forward and trailing end portions, respectively, of the panel. Each of the strap means is identical, and only one is therefore described in detail. The strap means comprise an elongated main strap 46 of heavy web material or the like, having a first end 48 extending through a slot 50 in a bracket 52, and being sewn upon itself to effect connection of the bracket thereto. The bracket is metallic and is coated with a flexible substance as at 54 to avoid damage to the vehicle finish. The opposite end 56 of the strap 46 extends through a slide member 58 and is sewn or otherwise secured upon itself to retain said connection. Extending through the slide member is a supplementary strap 60 having a buckle 62 of conventional form at one end and having a free end 64. The free end 64 is extended through a slot 66 in a second end connection bracket 68, having a similarly coated lip portion 70, and the free end is therein engaged with the buckle 62.

The main extents of the straps 46 are disposed within the sleeve leading and trailing portions of the main panel. The straps overlie and press against the slats, and the slat ends, thereby fixedly positioning the elements in place when in use.

In the use of the first form of the apparatus, the coated lip portions of the connectors engage the vehicle rain gutter 72 on each side of the vehicle roof. In view of the provision of a supplementary strap for tightening and loosening purposes, the mounting of the assembly is readily accomplished, and the panel tightly engaged in place with only a single application of force to the free end of the supplementary strap when extended through the first portion of the buckle.

In FIGS. 6 through 9, a second form of the invention, designated 12a shown. The identification means 12a comprises a flat fabric panel 14a preferably formed of material having a water resistant coating of plastic or the like on its outer surface 16a. Numerals 18a attached to said outer surface are luminous or other outstanding, readily viewed material. In an illustrative example, the surface 16a may be of light yellow color, while the numerals 18a are of luminous red, thereby making the indicia readily perceivable, even from a helicopter or airplane.

The panel 14a has side portions 20a, 22a, and leading and trailing end portions 24a, 26a, each of which is reverted beneath the main panel and joined thereto by lines of stitching 28a. As in the first form of the invention, this procedure produces tubular sleeves at the sides and ends of the panel, each defining a passageway. Flap elements 100, 102 are mounted adjacent the ends of the side portions 20a, 22a, and have the female portion 104 of a snap fastener thereon. The male portions 106 are fixed on the outer surface 16a, and as best shown in FIG. 9, the flaps 100 and 102 may be folded about the otherwise open ends of the side passageways on portions 20a and 22a to thereby close the same.

In the second form 12a of the invention, the device is provided with side slat means comprising a pair of longitudinally extending, elongated, rectangular slat members 32a, 34a, removably mounted in the passageways of the portions 20a and 22a. The slats are retained in the passageways principally by the flaps 100 and 102. The ends of the passageways and the leading and trailing portions are closed, inasmuch as these passageways do not have slats therein, and adjacent the respective ends of the said portions, the panel 14a has slits 108 therein. Reinforcing members 110, formed of leather or the like, and having slits corresponding in location to the slits 108, are attached to the surface 16a of the panel 14a by stitching or other suitable means.

Straps means 42a and 44a are provided for the leading and trailing portions of the panel, each being identical in construction, and extending through the passageways of the leading and trailing end portions. Straps each include a main strap 46a extending through the passageways and out the slit means over the reinforcing members and having first ends 48a extended through a slot 50a in a metallic bracket 52a. When thus engaged with the brackets, the ends are both stitched and riveted in place to effect a permanent connection. The operative end 56a of the main strap is engaged with a strap tightening buckle 112 of a previously known type, which includes a tubed engaging member 114 biased by a spring 116 to a position adjacent a forward bight member 118, and pivotal therefrom by compression of the member against the action of the spring. A supplementary strap 60a has a free end 64a extended about the bight member 118, and is connected with a second bracket 68a in the same manner that the end 48a of the main strap is connected to the bracket 52a.

In FIG. 6, the apparatus 12a is shown in position on the trunk deck lid 120 of an otherwise unmarked police cruiser or the like, while in FIG. 10, the device is engaged on the hood 122 of such a vehicle. Both the hood and the trunk deck lids have side edges with which the brackets 52a and 68a engage. When preliminarily connected with said edges, the ends 64a of the supplementary straps may be pulled through the buckles 112 in a strap tightening direction. However, due to action of the spring and teeth of the member 114, the strap is held at the position in which it is placed by pulling until the member 114 is pivoted against the spring to permit release of the strap. It will be noted that this permits a very rapid application of a number to the selected vehicle body area.

I claim:

1. A temporary means for aerial identification of a vehicle having upper body sections, the means comprising:

an indicia bearing panel of rectangular form and of an area of sufficient size to extend over a substantial portion of one of said vehicle upper body sections;

the panel being flexible and having an exposed fabric side with a background color and being provided with indicia of a color contrasting the background color of said side whereby the indicia is readily observable;

the panel having side portions and leading and trailing end portions, said portions being reverted and being attached to the side opposite said fabric side to provide sleeves adjacent the outer edges of the panel;

the side portion sleeves being open at their leading ends and each having an elongated side portion slat disposed therein and extending substantially the full length of the side portion, each of said side portion slats having a forward end and a rear end;

at least the leading end portion sleeve being closed at its ends and having an elongated, rigid end portion slat therein with ends extended over the forward ends of the side portion slats;

the end portion sleeves having slits therein; and a pair of straps extending respectively through said end portion sleeves and passing through said slits, one of said straps being engaged over the end portion slat and over the forward ends of the side portion slats, and the other of said straps being extended over the rear ends of the side portion slats.

2. The invention of claim 1, wherein:

the strap means each comprise an elongated main strap having opposite ends;

one of the ends of the main strap being directly connected to a first end of the connector; and adjustment means comprising a supplementary strap of loop form including a movable buckle, interposed between the other end of the main strap and a second end connector.

3. The invention of claim 1, wherein:

the strap means each comprise an elongated main strap having opposite ends;

one of the ends of the main strap being directly connected to a first end of the connector; and adjustment means comprising a supplementary strap of loop form including a movable buckle, interposed between the other end of the main strap and a second end connector.

* * * * *